US011948722B2

(12) United States Patent
Lai et al.

(10) Patent No.: US 11,948,722 B2
(45) Date of Patent: Apr. 2, 2024

(54) PLANAR WINDING TRANSFORMER

(71) Applicants: CHICONY POWER TECHNOLOGY CO., LTD., New Taipei (TW); NATIONAL TAIPEI UNIVERSITY OF TECHNOLOGY, Taipei (TW)

(72) Inventors: Yen-Shin Lai, New Taipei (TW); Yong-Yi Huang, New Taipei (TW); Chun-Hung Lee, New Taipei (TW); Hao-Chieh Chang, New Taipei (TW)

(73) Assignees: CHICONY POWER TECHNOLOGY CO., LTD., New Taipei (TW); NATIONAL TAIPEI UNIVERSITY OF TECHNOLOGY, Taipei (TW)

(*) Notice: Subject to any disclaimer, the term of this patent is extended or adjusted under 35 U.S.C. 154(b) by 556 days.

(21) Appl. No.: 17/144,835

(22) Filed: Jan. 8, 2021

(65) Prior Publication Data

US 2022/0084737 A1    Mar. 17, 2022

(30) Foreign Application Priority Data

Sep. 17, 2020   (TW) .................................. 109132176

(51) Int. Cl.
*H01F 27/28* (2006.01)
*H01F 27/24* (2006.01)
*H01F 27/42* (2006.01)

(52) U.S. Cl.
CPC ......... *H01F 27/2804* (2013.01); *H01F 27/24* (2013.01); *H01F 27/42* (2013.01);
(Continued)

(58) Field of Classification Search
CPC ...... H01F 27/2804; H01F 27/24; H01F 27/42; H01F 2027/2809; H01F 2027/2819;
(Continued)

(56) References Cited

U.S. PATENT DOCUMENTS 10,211,746 B1    2/2019  Lin
2004/0174241 A1   9/2004  He
(Continued)

FOREIGN PATENT DOCUMENTS

CN    106971829 A    7/2017
CN    110428960 A    11/2019
(Continued)

*Primary Examiner* — Shawki S Ismail
*Assistant Examiner* — Matthew T Sarles
(74) *Attorney, Agent, or Firm* — MUNCY, GEISSLER, OLDS & LOWE, P.C.

(57) ABSTRACT

A planar winding transformer includes a magnetic core set and a multilayer circuit board. The magnetic core set includes two magnetic cores and two magnetic columns. The two magnetic cores are parallel to each other. The multilayer circuit board is disposed between two magnetic cores, and two magnetic columns penetrate through the multilayer circuit board. The multilayer circuit board includes two low voltage winding layers and one high voltage winding layer. Two low voltage winding layers are connected to each other in parallel, and the high voltage winding layer is disposed between two low voltage winding layers. When the high voltage winding layer receives a polarity current, at least one of the low voltage winding layers generates a corresponding induced current. Two magnetic cores and two magnetic columns form a closed path for magnetic flux.

13 Claims, 13 Drawing Sheets

(52) U.S. Cl.
CPC ............... *H01F 2027/2809* (2013.01); *H01F 2027/2819* (2013.01)

(58) Field of Classification Search
CPC ...... H01F 3/10; H01F 2038/006; H01F 27/40; H01F 2027/408; H01F 27/29; H02M 3/01; H02M 3/285; H02M 3/33573; H02M 1/0064; H02M 3/33592; Y02B 70/10
See application file for complete search history.

(56) References Cited

U.S. PATENT DOCUMENTS

| | | | | |
|---|---|---|---|---|
| 2005/0151614 | A1* | 7/2005 | Dadafshar | H01F 27/255 336/223 |
| 2010/0321960 | A1* | 12/2010 | Nakahori | H02M 3/33573 363/21.04 |
| 2015/0155089 | A1 | 6/2015 | Lu | |
| 2017/0310228 | A1* | 10/2017 | Nakajima | H01F 27/2804 |
| 2017/0330678 | A1 | 11/2017 | Harrison | |
| 2018/0025828 | A1* | 1/2018 | Nakajima | H02M 3/33507 363/17 |
| 2019/0043660 | A1* | 2/2019 | Jin | H02M 3/33592 |
| 2019/0043661 | A1* | 2/2019 | Jin | H01F 27/346 |
| 2019/0075657 | A1 | 3/2019 | Esposito | |
| 2020/0219643 | A1* | 7/2020 | Li | H01F 27/28 |
| 2020/0350117 | A1* | 11/2020 | Nabih | H01F 38/00 |
| 2021/0193366 | A1* | 6/2021 | Wang | H01F 27/24 |
| 2021/0327634 | A1* | 10/2021 | Liang | H01F 29/025 |
| 2022/0084734 | A1* | 3/2022 | Lai | H02M 3/003 |
| 2022/0084737 | A1* | 3/2022 | Lai | H01F 27/24 |
| 2023/0094775 | A1* | 3/2023 | Lai | H05K 1/165 336/200 |

FOREIGN PATENT DOCUMENTS

| | | |
|---|---|---|
| TW | 201336225 A | 9/2013 |
| TW | M509967 U | 10/2015 |
| TW | I594277 B | 8/2017 |
| TW | 201830421 A | 8/2018 |
| TW | M569488 U | 11/2018 |
| TW | I643222 B | 12/2018 |

* cited by examiner

PLANAR WINDING TRANSFORMER

CROSS REFERENCE TO RELATED APPLICATIONS

This Non-provisional application claims priority under 35 U.S.C. § 119(a) on Patent Application No(s). 109132176 filed in Taiwan, Republic of China on Sep. 17, 2020, the entire contents of which are hereby incorporated by reference.

BACKGROUND

Technology Field

The present disclosure relates to a transformer and, in particular, to a planar winding transformer.

Description of Related Art

In the application of switched-mode power supply unit (PSU), due to the requirements of high efficiency and high power (wattage), many circuits and architectures with improved performance have been developed. In particular, many innovated circuits and architectures are introduced in the application of DC/DC converter.

FIG. 1 is a block diagram of a conventional power supply. As shown in FIG. 1, the input is a high voltage AC/DC input, and a DC/DC converter 2 is provided. When the output of the converter 2 is applied to the low voltage output with large current, the loss of the DC/DC converter 2 is quite huge. Therefore, in the DC/DC converter, multiple transformers 10 at the high voltage side are connected in series, and multiple transformers 10 at the low voltage side are connected in parallel, thereby achieving the effect of current sharing. The advantages of this design are to reduce the current stress and conduction loss of the low voltage side components, and to improve efficiency. However, in this approach, due to the use and combination of a plurality of transformers, the increased amount of components increases the difficulty of the overall design, and also significantly increases the overall volume. Particularly, the size of the transformer is the biggest problem. In addition, since the transformers are individually manufactured, the inductance errors between the transformers can easily cause uneven currents at the low voltage side.

In the transformer, magnetic components are one of the major factors in terms of the total volume and loss. Therefore, reducing the volume and loss of magnetic components is an effective means to reduce the overall volume of the transformer and to improve performance. However, the reduction in the volume of magnetic components is often accompanied by an increase in the loss. Therefore, it is desired to provide an improved transformer by optimizing the magnetic components, thereby reducing the overall volume of the transformer after integration and reducing the loss.

SUMMARY

In view of the foregoing, an objective of this disclosure is to provide an integrated transformer that integrates multiple transformers to the same magnetic core with connecting in series at the high voltage side and connecting in parallel at the low voltage side, and adopts the planar winding design, thereby achieving the effect of current sharing in the application of low voltage output with large current, reducing the current stress and conduction loss of the components at low voltage side, minimizing the total volume, and decreasing the loss.

To achieve the above, this disclosure discloses a planar winding transformer, which comprises a magnetic core set and a multilayer circuit board. The magnetic core set comprises a first magnetic core, a second magnetic core, a first magnetic column and a second magnetic column. The first magnetic core and the second magnetic core are parallel to each other. The first magnetic column and the second magnetic column are disposed between the first magnetic core and the second magnetic core. The multilayer circuit board is disposed between the first magnetic core and the second magnetic core, and the first magnetic column and the second magnetic column penetrate through the multilayer circuit board. The multilayer circuit board comprises a first low voltage winding layer, a second low voltage winding layer and a high voltage winding layer. The second low voltage winding layer is connected in parallel with the first low voltage winding layer, and the high voltage winding layer is disposed between the first low voltage winding layer and the second low voltage winding layer. When the high voltage winding layer receives a polarity current, the first low voltage winding layer and/or the second low voltage winding layer generate a corresponding induced current. The first magnetic core, the second magnetic core, the first magnetic column and the second magnetic column form a closed path for magnetic flux.

In one embodiment, the high voltage winding layer comprises a first high voltage winding and a second high voltage winding connected in series, the first high voltage winding winds around the first magnetic column, and the second high voltage winding winds around the second magnetic column.

In one embodiment, a flow direction of the polarity current flowing around the first magnetic column or the second magnetic column is opposite to a flow direction of the corresponding induced current.

In one embodiment, a flow direction of the polarity current in the first high voltage winding is opposite to a flow direction of the polarity current in the second high voltage winding.

In one embodiment, the first high voltage winding comprises a first high voltage sub-winding and a second high voltage sub-winding electrically connected to each other, and the first high voltage sub-winding is disposed between the second high voltage sub-winding and the first low voltage winding layer. The second high voltage winding comprises a third high voltage sub-winding and a fourth high voltage sub-winding electrically connected to each other, and the third high voltage sub-winding is disposed between the fourth high voltage sub-winding and the second low voltage winding layer. The second high voltage sub-winding is electrically connected to the third high voltage sub-winding.

In one embodiment, the first high voltage sub-winding and the second high voltage sub-winding are stacked with each other, and are electrically connected to each other through a via.

In one embodiment, the third high voltage sub-winding and the fourth high voltage sub-winding are stacked with each other, and are electrically connected to each other through a via.

In one embodiment, the first high voltage sub-winding and the fourth high voltage sub-winding are disposed in the same layer of the multilayer circuit board.

In one embodiment, the second high voltage sub-winding and the third high voltage sub-winding are disposed in the same layer of the multilayer circuit board, and are electrically connected to each other through a conductive sheet.

In one embodiment, the first low voltage winding layer comprises a first low voltage winding and a second low voltage winding, the second low voltage winding layer comprises a third low voltage winding and a fourth low voltage winding, the first low voltage winding and the third low voltage winding wind around the first magnetic column, and the second low voltage winding and the fourth low voltage winding wind around the second magnetic column.

In one embodiment, during a positive half cycle, the polarity current is a first polarity current and the generated induced current is a first induced current, and during a negative half cycle, the polarity current is a second polarity current and the generated induced current is a second induced current. The first induced current flows through a part of the first low voltage winding layer and the second low voltage winding layer, and the second induced current flows through another part of the first low voltage winding layer and the second low voltage winding layer.

In one embodiment, the first induced current flows through the first low voltage winding and the third low voltage winding, and the second induced current flows through the second low voltage winding and the fourth low voltage winding.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

The planar winding transformer integrates multiple transformers to the same magnetic core with connecting in series at the high voltage side and connecting in parallel at the low voltage side, thereby achieving the effect of current sharing in the application of low voltage output with large current, reducing the current stress and conduction loss of the components at low voltage side, minimizing the total volume, and decreasing the loss.

Figure 1:
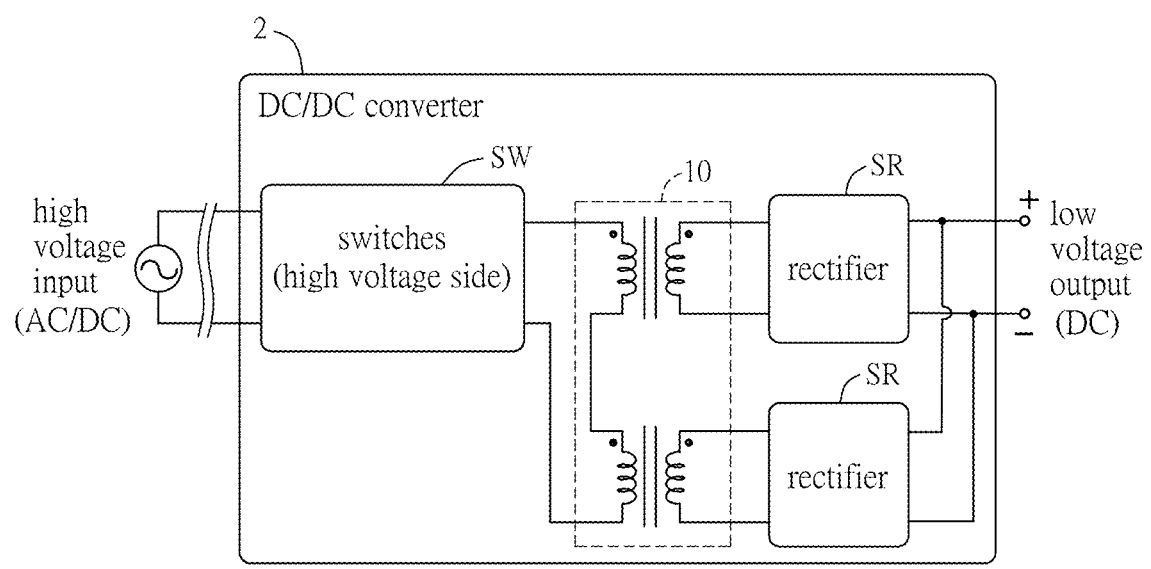
FIG. 1 is a block diagram of a conventional power supply.
Figure 2A:
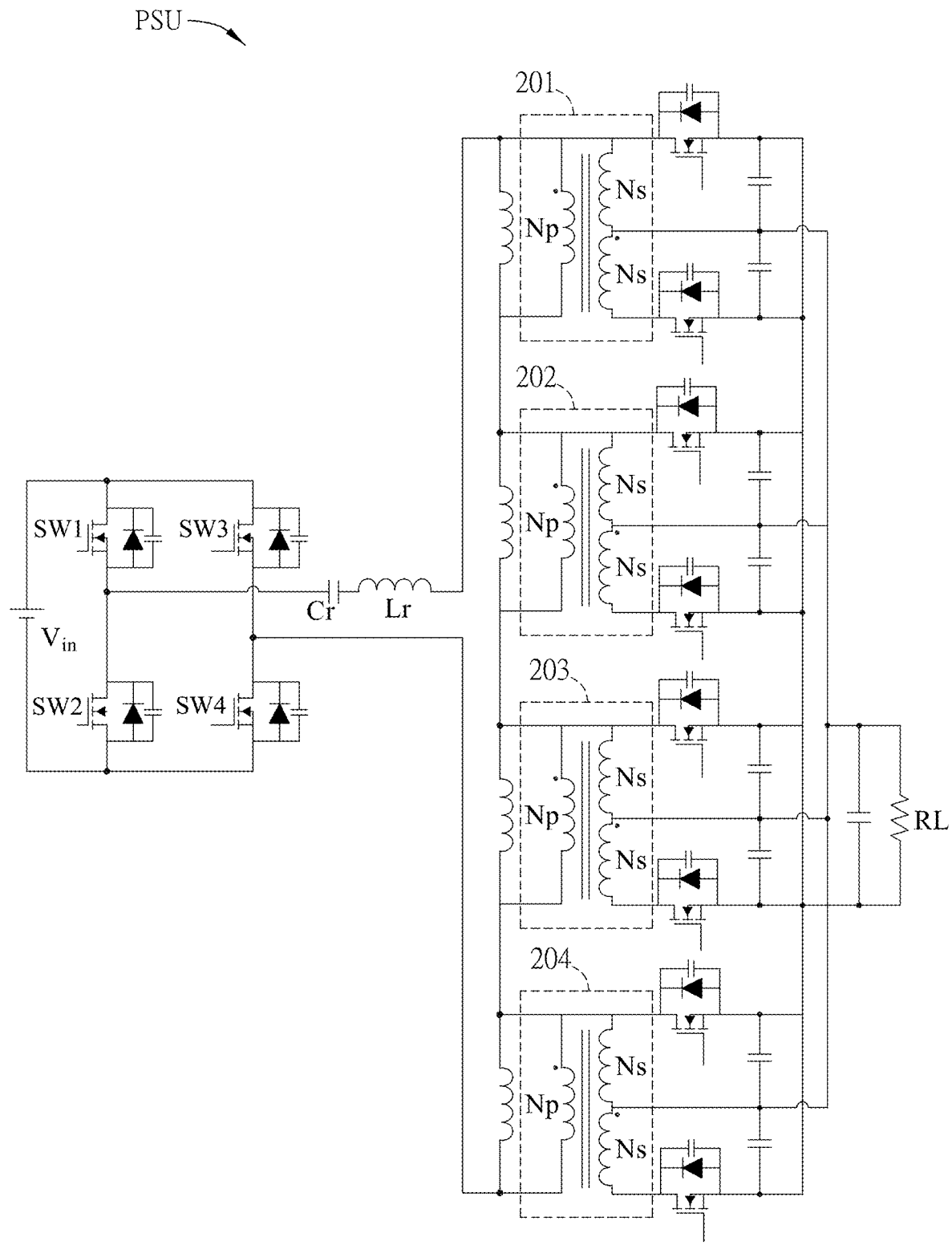
FIG. 2A is a schematic circuit diagram of a power supply.
Figure 2B:
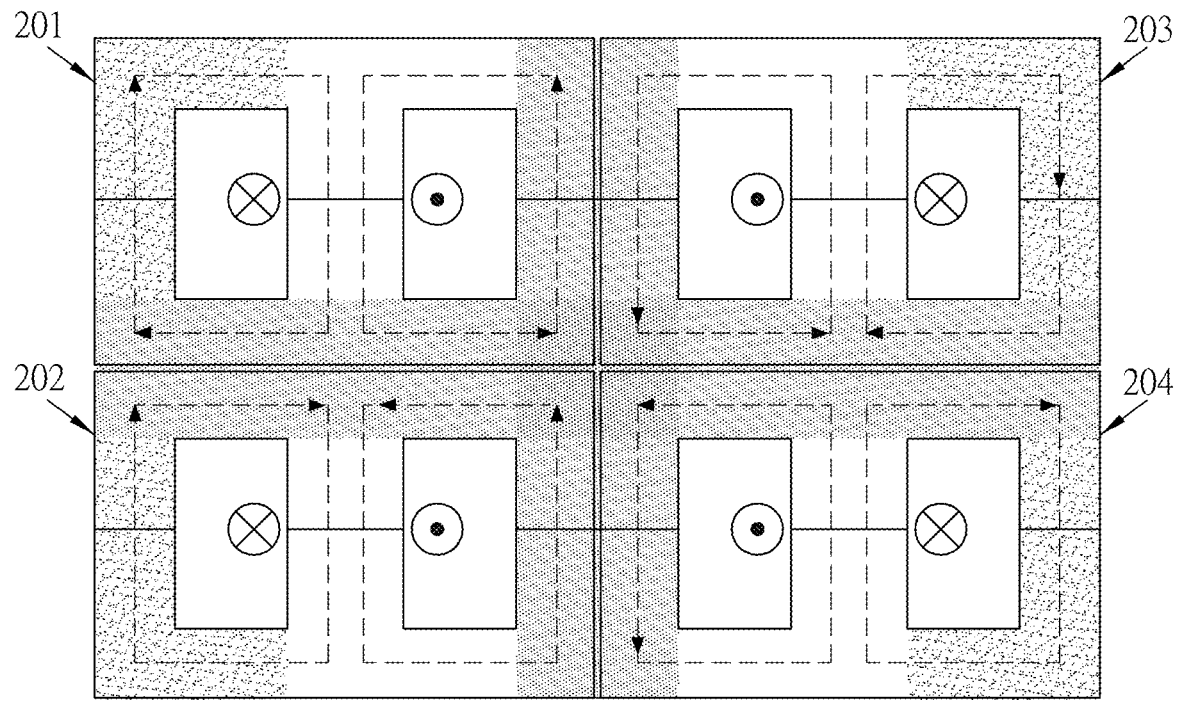
FIG. 2B is a schematic diagram showing the paths for magnetic flux of the transformers in FIG. 2A.
Figure 2C:
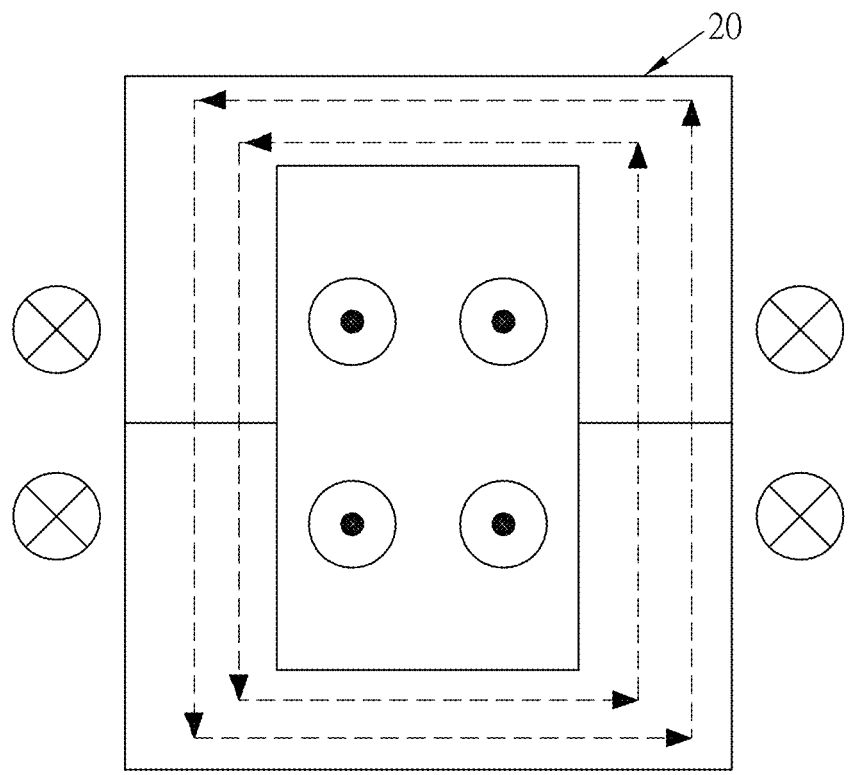
FIG. 2C is a schematic diagram showing the magnetic coupling of magnetic flux of FIG. 2B.

The magnetic coupling of magnetic flux of this disclosure will be described with reference to FIGS. 2A to 2C. FIG. 2A is a schematic circuit diagram of a power supply. The power supply PSU comprises an input voltage Vin, switch elements SW1~SW4, a capacitor Cr, an inductor Lr, a load RL, and four transformers 201~204, wherein the transformers 201~204 are connected in series at the high voltage side and are connected in parallel at the low voltage side. FIG. 2B is a schematic diagram showing the paths for magnetic flux of the transformers in FIG. 2A, and FIG. 2C is a schematic diagram showing the magnetic coupling of magnetic flux of FIG. 2B. Regarding the four transformers as shown in FIG. 2A, the four transformers are arranged as shown in FIG. 2B, wherein the high voltage side windings wind around the center columns of the transformers, respectively. In the left two transformers 201 and 202, the windings wind around the corresponding center columns, wherein the winding goes into the page on the left side of the center column, and comes out of the page on the right side of the center column. In the right two transformers 203 and 204, the windings wind around the corresponding center columns, wherein the winding comes out of the page on the left side of the center columns, and goes into the page on the right side of the center column. According to the right-hand rule, the directions of magnetic flux in the transformers 201~204 are shown as the dotted arrows. In the left two transformers 201 and 202, the direction of magnetic flux in the center column goes down of the page, the directions of magnetic flux in the side columns go up of the page, the left loop is in the clockwise direction, and the right loop is in the counterclockwise direction. In the right two transformers 203 and 204, the direction of magnetic flux in the center column goes up of the page, the directions of magnetic flux in two side columns go down of the page, the left loop is in the counterclockwise direction, and the right loop is in the clockwise direction. The directions of magnetic flux at the center cross region are opposite, so that the magnetic flux is cancelled out, thereby sufficiently decreasing the magnetic flux in this region. Accordingly, the magnetic core in this region can be removed for decreasing the volume of the transformer. Moreover, in order to further decrease the size of transformers and to simplify the magnetic cores, the magnetic core at the four corners can be simplified so as to obtain the final magnetic core mode as shown in FIG. 2C. This design can integrate the original four transformers into a single magnetic core set, thereby sufficiently decreasing the occupied volume of the magnetic cores, and thus sufficiently reducing the volume of the entire transformer 20.

Figure 2D:
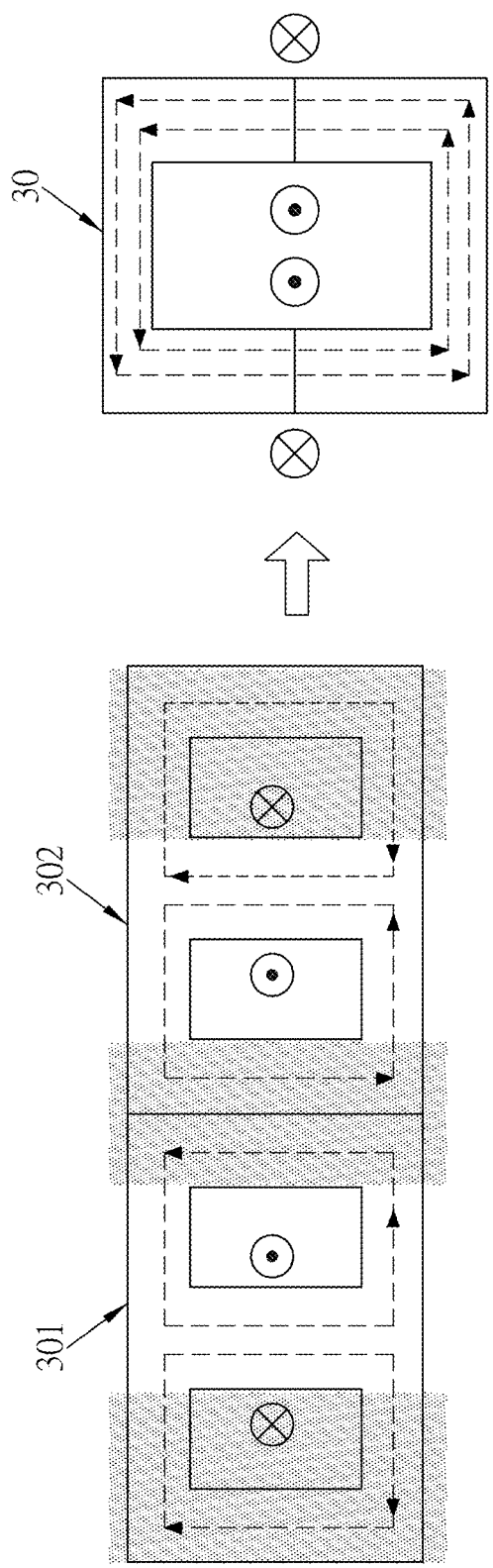
FIG. 2D is a schematic diagram showing the magnetic coupling of magnetic flux according to an embodiment of this disclosure.
Figure 2E:
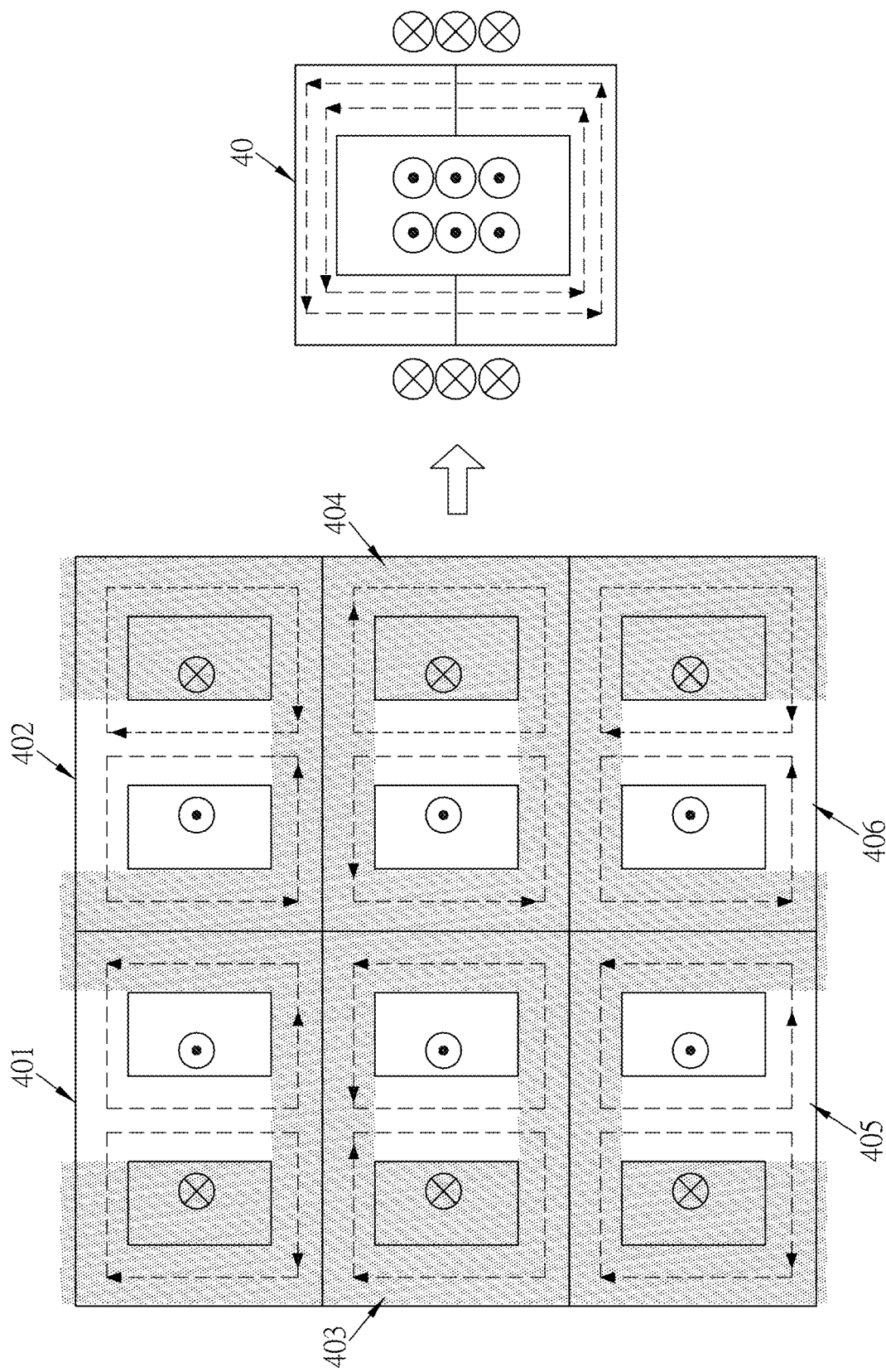
FIG. 2E is a schematic diagram showing the magnetic coupling of magnetic flux according to an embodiment of this disclosure.

To be noted, if the number of the transformers is 2N, all of the transformers can be integrated in the same magnetic core set, wherein N is a natural number (e.g. 1, 2, 3, . . . ). In other words, 2, 4, 6, . . . transformers can be arranged in the way of cancelling out partial magnetic flux, and then, after simplifying the magnetic cores, the multiple transformers can be integrated in the same magnetic core set. FIG. 2D indicates that the paths for magnetic flux of two transformers 301 and 302 are coupled, and the two transformers 301 and 302 are integrated in the same magnetic core set so as to form the transformer 30. FIG. 2E indicates that the paths for magnetic flux of six transformers 401~406 are coupled, and the six transformers 401~406 are integrated in the same magnetic core set so as to form the transformer 40. The volume of the integrated magnetic cores (magnetic core set) is sufficiently decreased, so that the total volume of the transformer 30 or 40 can be sufficiently reduced. The magnetic core set may comprise four magnetic columns or two magnetic columns. In this embodiment, the magnetic core set preferably comprises two magnetic columns, so that the volume of the magnetic core set is smaller and the number of the integrated transformers and the number of turns of winding are more flexible. Herein, 2N transformers can be integrated in one magnetic core set.

Figure 3A:
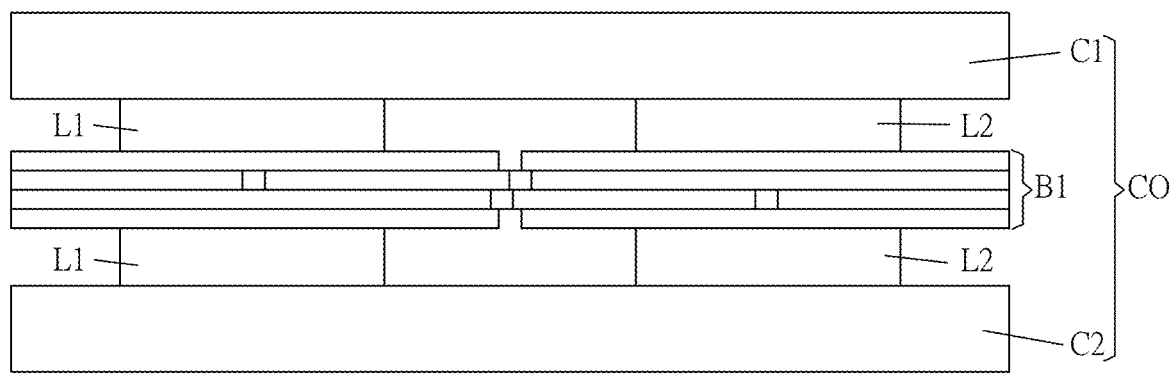
FIG. 3A is a front view of a planar winding transformer according to an embodiment of this disclosure.
Figure 3B:
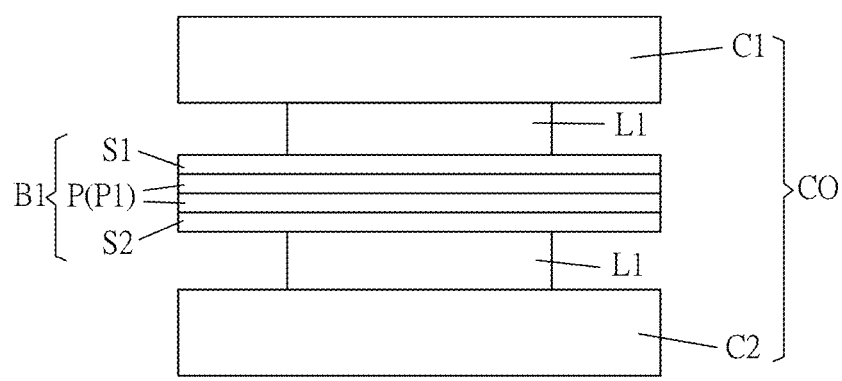
FIG. 3B is a side view of the planar winding transformer according to an embodiment of this disclosure.
Figure 3C:
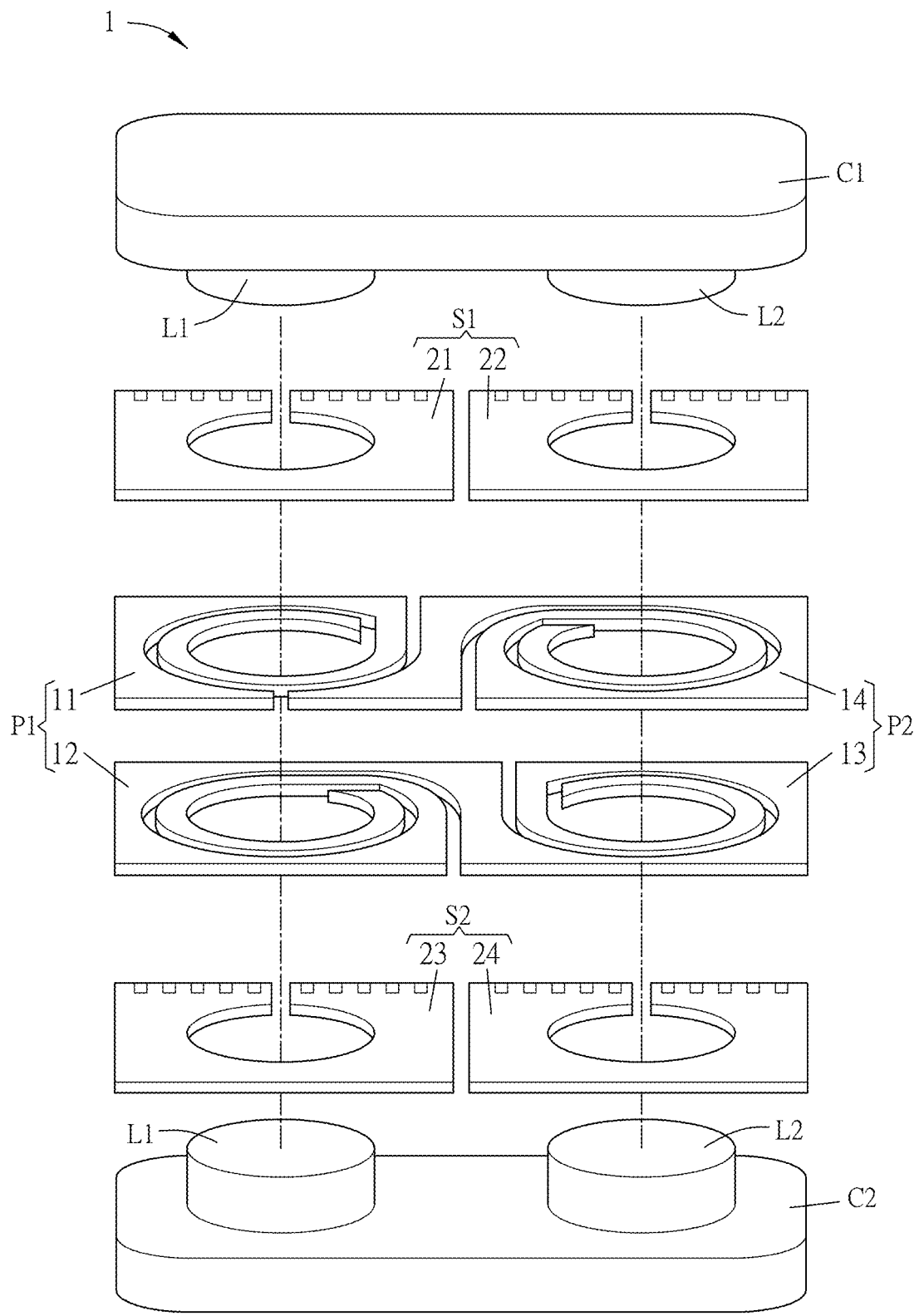
FIG. 3C is an exploded view of the planar winding transformer according to an embodiment of this disclosure.

FIG. 3A is a front view of a planar winding transformer according to an embodiment of this disclosure, FIG. 3B is a side view of the planar winding transformer according to an embodiment of this disclosure, and FIG. 3C is an exploded view of the planar winding transformer according to an embodiment of this disclosure.

As shown in FIGS. 3A to 3C, in this embodiment, the transformer 1 is equivalent to the integration of two conventional transformers, which utilize the magnetic core assembled by two UU cores, wherein the turns ratio of the windings at the high voltage side and the low voltage side is 4:1:1. The transformer 1 is a planar winding transformer, wherein the windings thereof are formed by a plurality of layers of printed circuit boards, and the planar windings wind around the magnetic core to form the path for magnetic flux of the transformer 1.

Referring to FIGS. 3A and 3B, the transformer 1 is composed of the magnetic core set CO and a multilayer circuit board B1. The multilayer circuit board B1 comprises a plurality of stacked planar winding layers, and is disposed within the magnetic core set CO. The magnetic core set CO comprises a first magnetic core C1, a second magnetic core C2, a first magnetic column L1, and a second magnetic column L2. The first magnetic core C1 and the second magnetic core C2 are parallel to each other. The multilayer circuit board B1 is disposed between the first magnetic core C1 and the second magnetic core C2, and the first magnetic column L1 and the second magnetic column L2 penetrate through the multilayer circuit board B1. The multilayer circuit board B1 comprises a first low voltage winding layer S1, a second low voltage winding layer S2, and a high voltage winding layer P. The second low voltage winding layer S2 is connected in parallel with the first low voltage winding layer S1, and the high voltage winding layer P is disposed between the first low voltage winding layer S1 and the second low voltage winding layer S2.

Referring to FIG. 3C, the high voltage winding layer P comprises a first high voltage winding P1 and a second high voltage winding P2, which are connected in series. The first high voltage winding P1 winds around the first magnetic column L1, and the second high voltage winding P2 winds around the second magnetic column L2. The first high voltage winding P1 comprises a first high voltage sub-winding 11 and a second high voltage sub-winding 12, which are electrically connected to each other and stacked to each other. The first high voltage sub-winding 11 is disposed between the second high voltage sub-winding 12 and the first low voltage winding layer S1. The second high voltage winding P2 comprises a third high voltage sub-winding 13 and a fourth high voltage sub-winding 14, which are electrically connected to each other and stacked to each other. The third high voltage sub-winding 13 is disposed between the fourth high voltage sub-winding 14 and the second low voltage winding layer S2. The second high voltage sub-winding 12 is electrically connected to the third high voltage sub-winding 13.

The first low voltage winding layer S1 comprises a first low voltage winding 21 and a second low voltage winding 22, and the second low voltage winding layer S2 comprises a third low voltage winding 23 and a fourth low voltage winding 24. In this embodiment, four coils are configured at the low voltage side, and the number of turns of winding of each coil is 1. The first low voltage winding 21 and the third low voltage winding 23 wind around the first magnetic column L1, and the second low voltage winding 22 and the fourth low voltage winding 24 wind around the second magnetic column L2.

Figure 4:
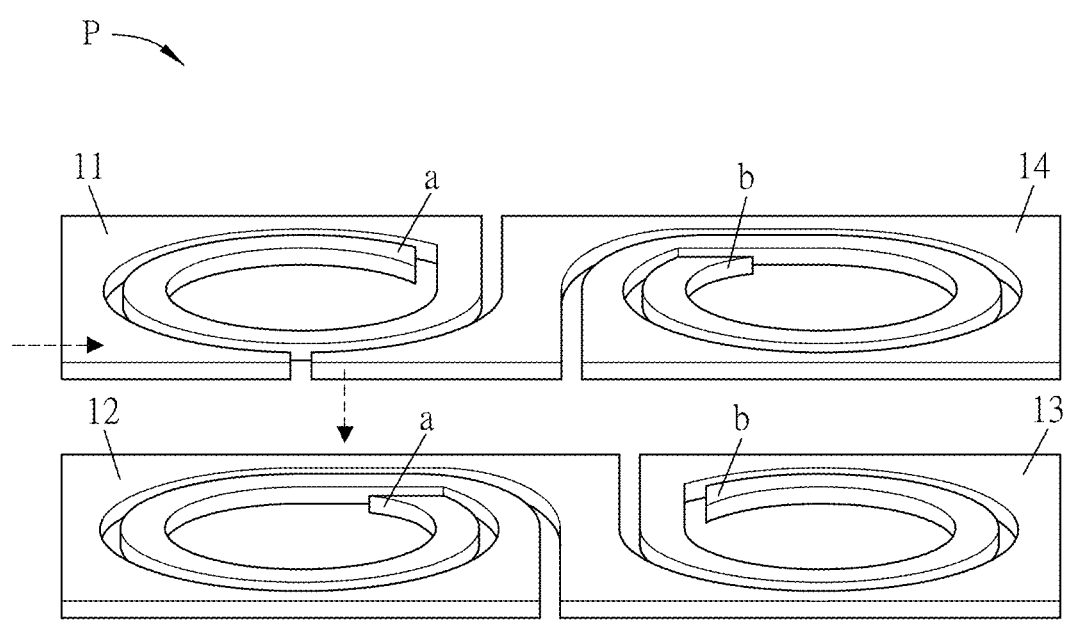
FIG. 4 is a schematic diagram showing a high voltage winding of the planar winding transformer according to an embodiment of this disclosure.

FIG. 4 is a schematic diagram showing a high voltage winding of the planar winding transformer according to an embodiment of this disclosure. Referring to FIG. 4, in the high voltage winding layer P, the first high voltage sub-winding 11 and the fourth high voltage sub-winding 14 are disposed at one layer in the multilayer circuit board B1, and the second high voltage sub-winding 12 and the third high voltage sub-winding 13 are disposed at another layer in the multilayer circuit board B1. The two layers are stacked to each other. The second high voltage sub-winding 12 and the third high voltage sub-winding 13 can be an integrally formed metal winding or two separated windings electrically connected by a conductor, a conductive wire, or a conductive sheet. The winding of the high voltage winding layer P starts from the point at the upper-left corner (pointed out by the arrow located at the left side of the first high voltage sub-winding 11), winds clockwise for two rounds, and reaches the point a. The point a of the first high voltage sub-winding 11 is coupled to the point a of the second high voltage sub-winding 12 located at the lower layer through a via. Then, the winding winds for additional two rounds so as to finish the first high voltage winding P1 located at the left part of the high voltage winding layer P, wherein the number of turns of winding is 4. The second high voltage sub-winding 12 is connected to the third high voltage sub-winding 13 in series. The winding of the right part of the high voltage winding layer P starts from the left side of the third high voltage sub-winding 13 (at the lower layer), winds counterclockwise for two rounds, and reaches the point b. The point b of the third high voltage sub-winding 13 is coupled to the point b of the fourth high voltage sub-winding 14 located at the upper layer through a via. Then, the winding winds for additional two rounds so as to finish the second high voltage winding P2 located at the right part of the high voltage winding layer P, wherein the number of turns of winding is 4. In this embodiment, the winding directions of the first high voltage winding P1 and the second high voltage winding P2 are opposite to each other, and the first high voltage winding P1 and the second high voltage winding P2 are electrically connected in series.

Figure 5A:
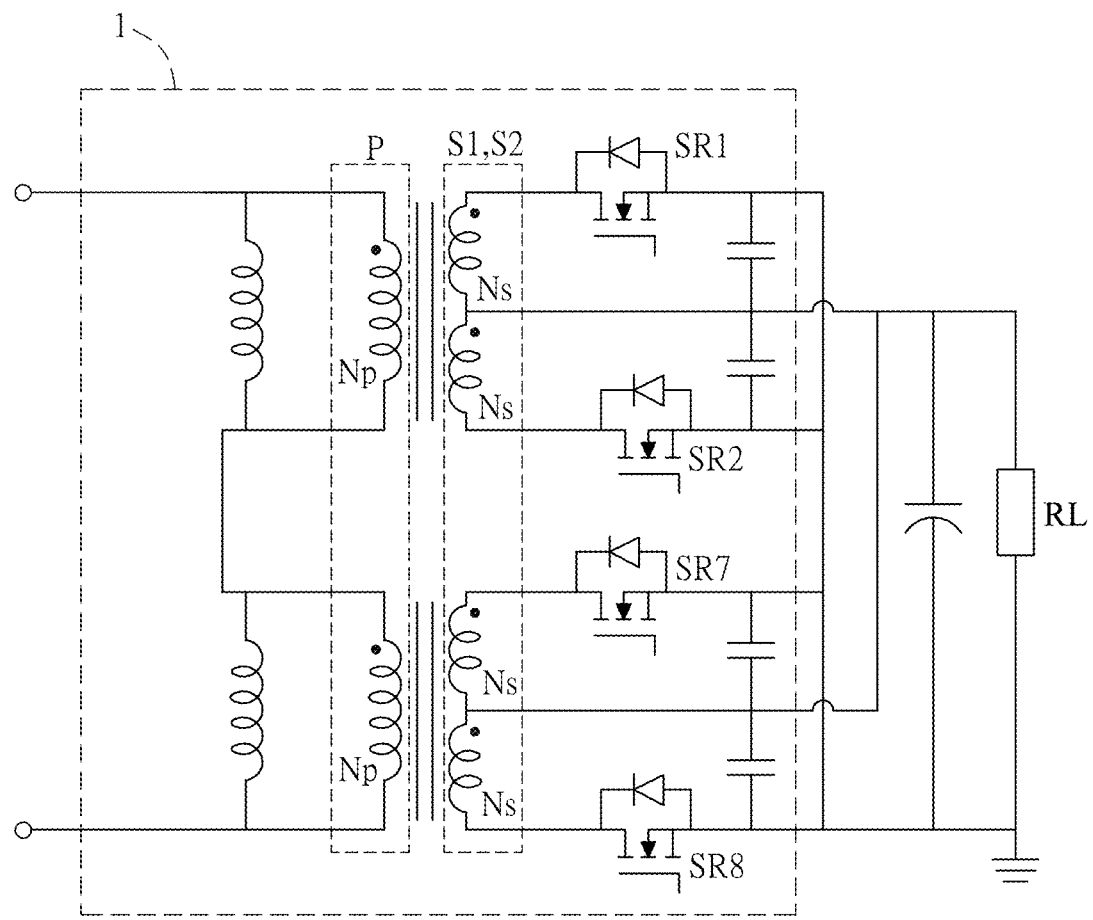
FIG. 5A is a circuit diagram of the planar winding transformer according to an embodiment of this disclosure.

FIG. 5A is a circuit diagram of the planar winding transformer according to an embodiment of this disclosure. As shown in FIG. 5A, the planar winding transformer comprises two sets of transformers, which totally comprise two coils Np located at the high voltage side and four coils Ns located at the low voltage side. In this embodiment, each coil Ns has two joints, and the transformer can be, for example, a center-tapped transformer. To be noted, the integrated transformers can be any type of transformer, and this disclosure is not limited. Referring to FIG. 5A, one end of the coil Ns is connected to the corresponding synchronous rectifier SR1/SR2/SR7/SR8, wherein the synchronous rectifier SR1 is connected to the synchronous rectifier SR7, and the synchronous rectifier SR2 is connected to the synchronous rectifier SR8. The other end of the coil Ns is connected to the other coil Ns of the same set of transformer through a via. As shown in the dotted block, in two sets of transformers, the coils Np located at the high voltage side are connected in series, and the coils Ns located at the low voltage side are connected in parallel.

Figure 5B:
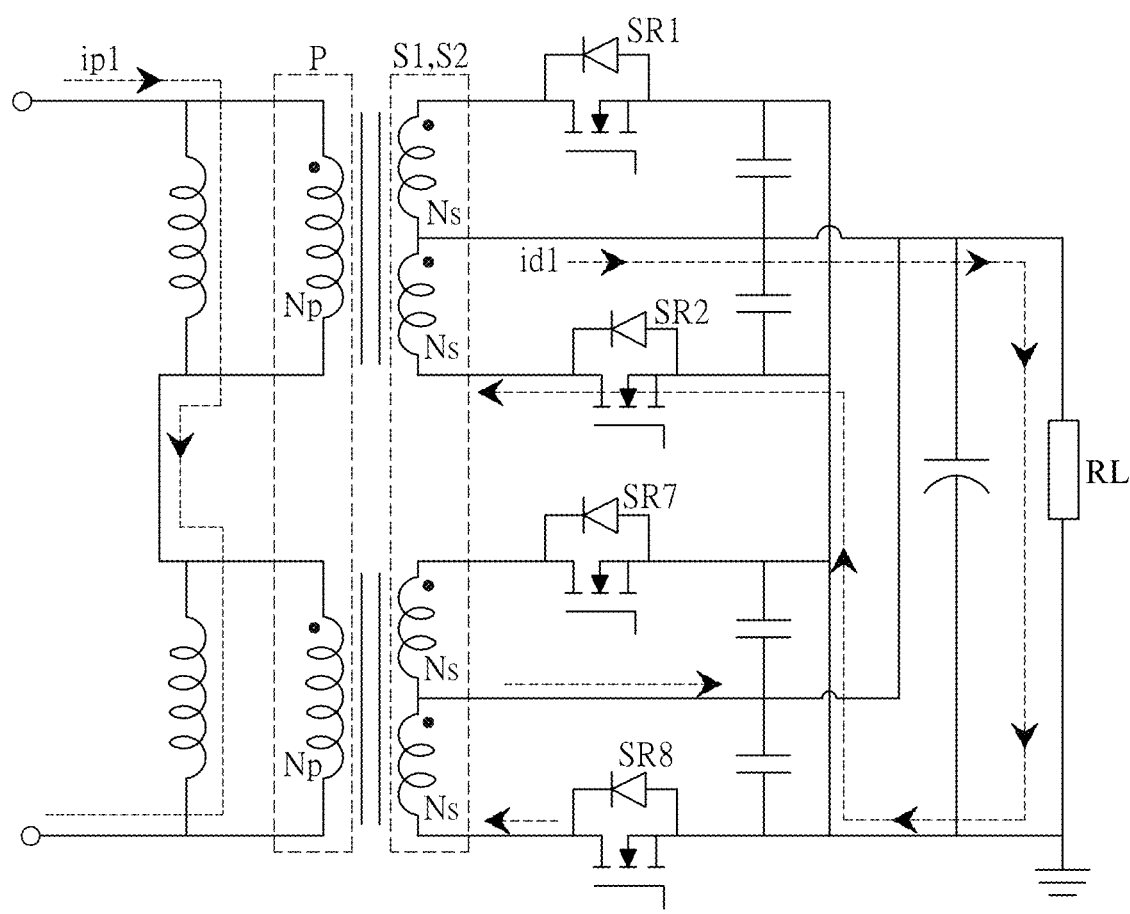
FIG. 5B is a schematic (circuit) diagram showing the current flow directions of the planar winding transformer according to an embodiment of this disclosure during the positive half cycle.
Figure 5C:
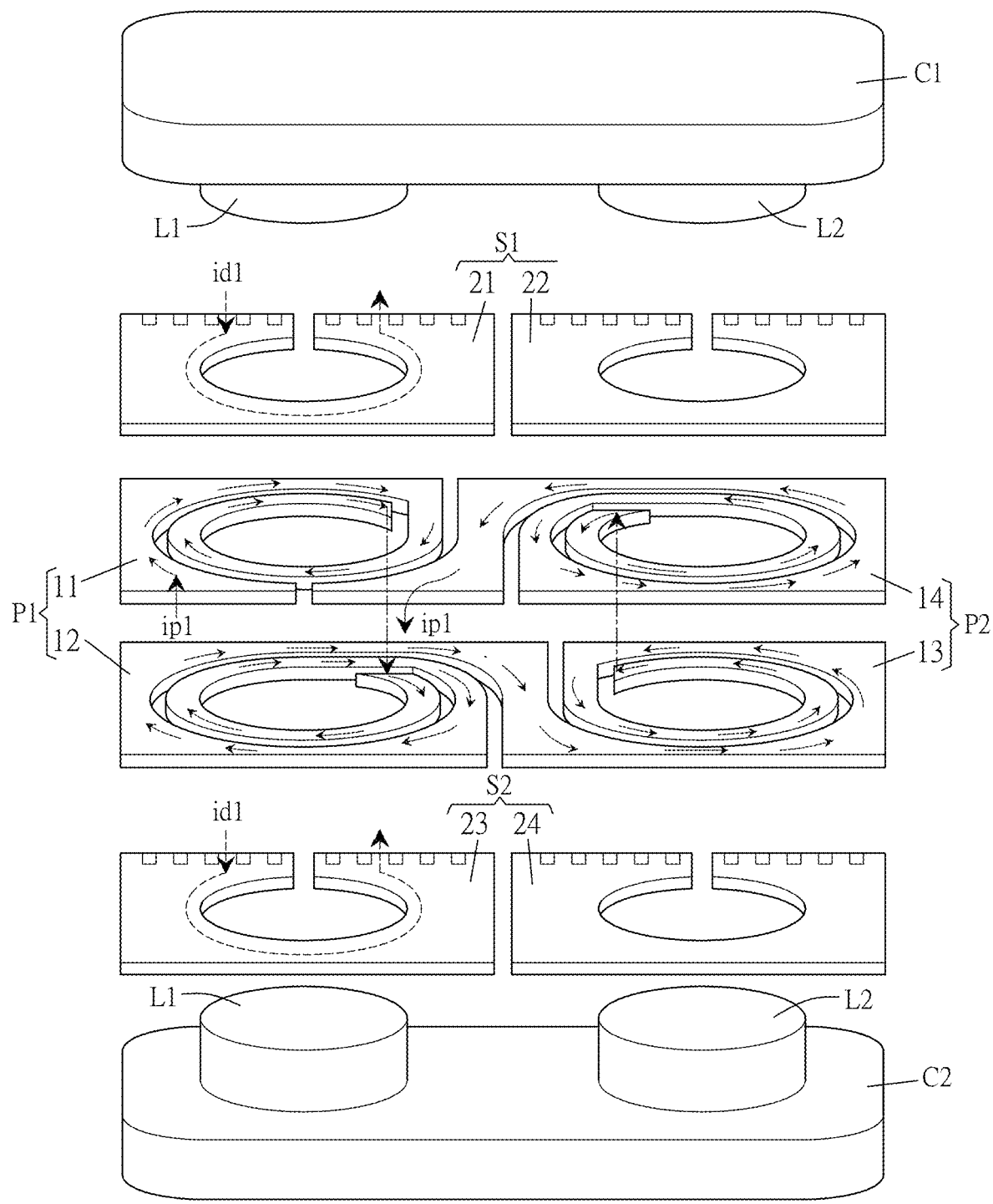
FIG. 5C is a schematic (winding) diagram showing the current flow directions of the planar winding transformer according to an embodiment of this disclosure during the positive half cycle.

FIG. 5B is a schematic (circuit) diagram showing the current flow directions of the planar winding transformer according to an embodiment of this disclosure during the positive half cycle. As shown in FIG. 5B, during the positive half cycle of AC power, the transformer 1 receives the first polarity current ip1, which flows through the coils Np at the high voltage side (high voltage winding layer P) from the top to the bottom (indicated as the arrow direction). Therefore, each of the coils Ns at the low voltage side is induced by the corresponding coil Np to generate a first induced current id1. Following the arrow direction, the first induced current id1 flows from the center tapped portion of the coil Ns to the load RL, and then enters the synchronous rectifiers SR2 and SR8. FIG. 5C is a schematic (winding) diagram showing the current flow directions of the planar winding transformer according to an embodiment of this disclosure during the positive half cycle. As shown in FIG. 5C, during the positive half cycle, the first polarity current ip1 enters the first high voltage sub-winding 11 and flows around the high voltage winding layer P. That is, the first polarity current ip1 flows through the first high voltage sub-winding 11, the second high voltage sub-winding 12, the third high voltage sub-winding 13, and the fourth high voltage sub-winding 14 in order. The first polarity current ip1 flows through the first high voltage sub-winding 11 and the second high voltage sub-winding 12 of the first high voltage winding P1 clockwise, and flows through the third high voltage sub-winding 13 and the fourth high voltage sub-winding 14 of the second high voltage winding P2 counterclockwise. In other words, regarding the first high voltage winding P1 and the second high voltage winding P2 of the coils Np at the high voltage side, during the positive half cycle, the first polarity current ip1 flows through the first high voltage winding P1 and the second high voltage winding P2, thereby inducing the first magnetic core C1, the second magnetic core C2, the first magnetic column L1, and the second magnetic column L2 to form a closed path for magnetic flux. Accordingly, the coils Ns at the low voltage side are correspondingly conducted by induction, so that the first low voltage winding layer S1 and the second low voltage winding layer S2 generate the corresponding first induced current id1 for conducting the first low voltage winding 21 and the third low voltage winding 23. In this embodiment, the first polarity current ip1 flows around the first magnetic column L1 in the clockwise direction, and the corresponding first induced current id1 flows in the counterclockwise direction. The flowing directions of these two currents ip1 and id1 are opposite to each other.

Figure 5D:
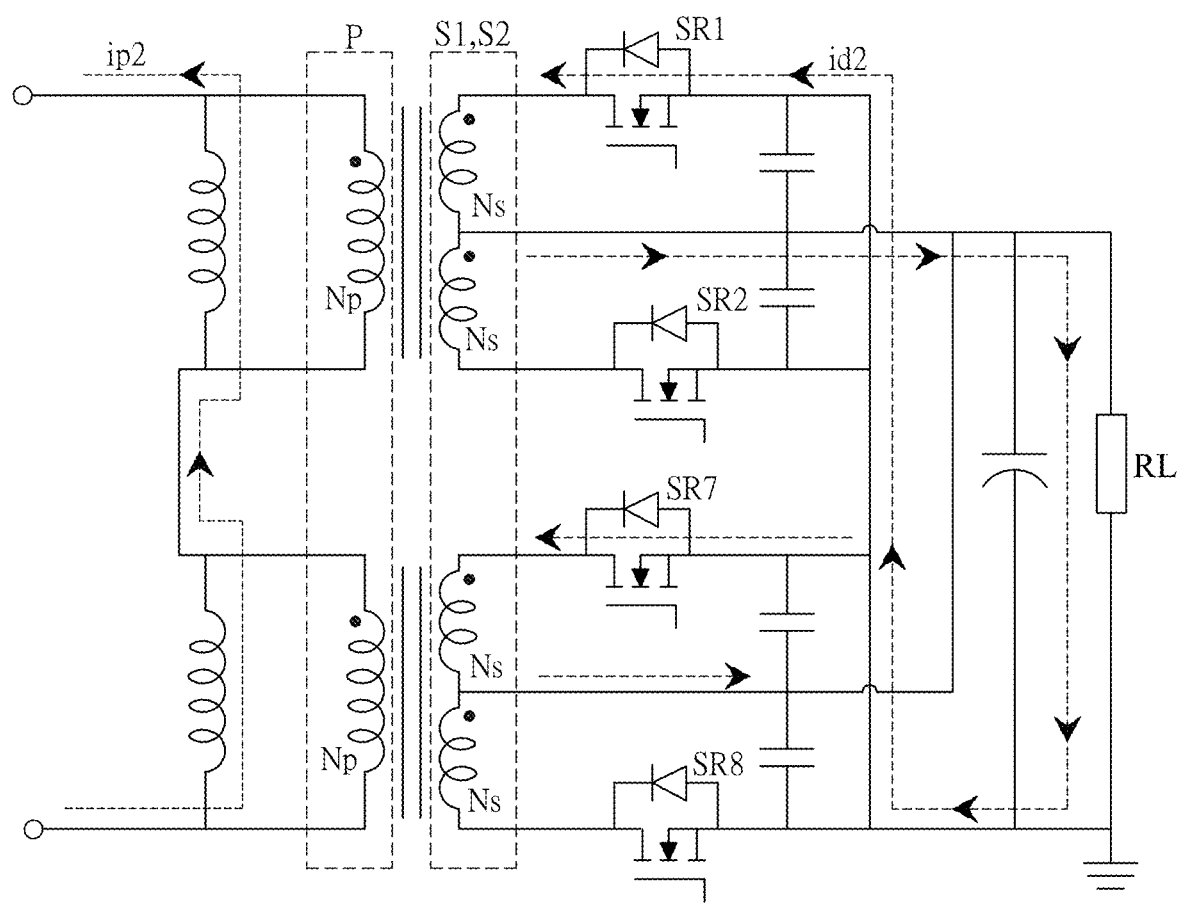
FIG. 5D is a schematic (circuit) diagram showing the current flow directions of the planar winding transformer according to an embodiment of this disclosure during the negative half cycle.
Figure 5E:
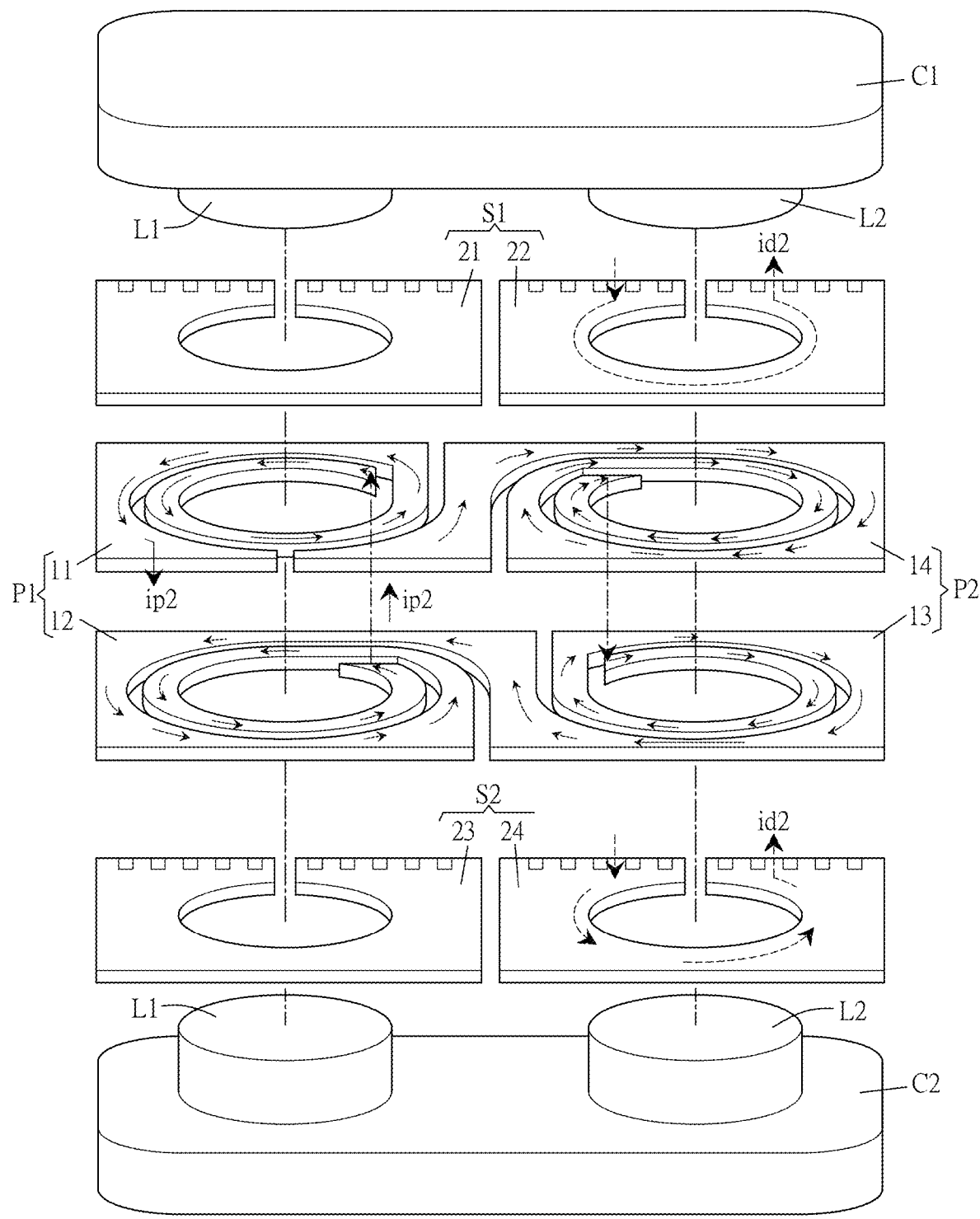
FIG. 5E is a schematic (winding) diagram showing the current flow directions of the planar winding transformer according to an embodiment of this disclosure during the negative half cycle.

FIG. 5D is a schematic (circuit) diagram showing the current flow directions of the planar winding transformer according to an embodiment of this disclosure during the negative half cycle, and FIG. 5E is a schematic (winding) diagram showing the current flow directions of the planar winding transformer according to an embodiment of this disclosure during the negative half cycle. As shown in FIGS. 5D and 5E, during the negative half cycle of AC power, the transformer 1 receives the second polarity current ip2, which flows through the coils Np at the high voltage side in a direction opposite to the direction as shown in FIG. 5B. The second polarity current ip2 flows through two coils Np at the high voltage side, and then each of the coils Ns at the low voltage side is induced by the corresponding coil Np to generate a second induced current id2. Following the arrow direction, the second induced current id2 flows from the center tapped portion of the coil Ns to the load RL, and then enters the synchronous rectifiers SR1 and SR7. As shown in FIG. 5E, the flowing direction of the second polarity current ip2 during the negative half cycle is opposite to the flow direction of the first polarity current ip1 during the positive half cycle. During the negative half cycle, the second polarity current ip2 enters the fourth high voltage sub-winding 14 and flows around the high voltage winding layer P. That is, the second polarity current ip2 flows through the fourth high voltage sub-winding 14, the third high voltage sub-winding 13, the second high voltage sub-winding 12, and the first high voltage sub-winding 11 in order. The second polarity current ip2 flows through the first high voltage sub-winding 11 and the second high voltage sub-winding 12 of the first high voltage winding P1 counterclockwise, and flows through the third high voltage sub-winding 13 and the fourth high voltage sub-winding 14 of the second high voltage winding P2 clockwise. In other words, regarding the first high voltage winding P1 and the second high voltage winding P2 of the coils Np at the high voltage side, during the negative half cycle, the second polarity current ip2 flows through the first high voltage winding P1 and the second high voltage winding P2, thereby inducing the first magnetic core C1, the second magnetic core C2, the first magnetic column L1, and the second magnetic column L2 to form a closed path for magnetic flux. Accordingly, the coils Ns at the low voltage side are correspondingly conducted by induction, so that the first low voltage winding layer S1 and the second low voltage winding layer S2 generate the corresponding second induced current id2 for conducting the second low voltage winding 22 and the fourth low voltage winding 24. In this embodiment, the second polarity current ip2 flows around the second magnetic column L2 in the clockwise direction, and the corresponding second induced current id2 flows in the counterclockwise direction. The flowing directions of these two currents ip2 and id2 are opposite to each other. The first induced current id1 flows through the first low voltage winding 21 and the third low voltage winding 23, and the second induced current id2 flows through the second low voltage winding 22 and the fourth low voltage winding 24. That is, the first induced current id1 and the second induced current id2 flow through different parts of the first low voltage winding layer S1 and the second low voltage winding layer S2.

In addition, according to the circuit design of the planar winding transformer of this disclosure, the first low voltage winding 21, the second low voltage winding 22, the third low voltage winding 23, and the fourth low voltage winding 24 of the coils Ns at the low voltage side can be individually conducted by the configurations and positions of the synchronous rectifiers. Those skilled in the art can freely design the circuit based on the requirements. For example, it can be designed to conduct both the first low voltage winding 21 and the second low voltage winding 22, or to conduct both the first low voltage winding 21 and the fourth low voltage winding 24, or to conduct both the second low voltage winding 22 and the third low voltage winding 23, or to conduct both the third low voltage winding 23 and the fourth low voltage winding 24. This disclosure is not limited thereto. In one embodiment, during the positive half cycle, the first polarity current ip1 induces the coils Ns to generate the corresponding first induced current id1 so as to conduct both the first low voltage winding 21 and the second low voltage winding 22. During the negative half cycle, the second polarity current ip2 induces the coils Ns to generate the corresponding second induced current id2 so as to conduct both the third low voltage winding 23 and the fourth low voltage winding 24. In this embodiment, the first induced current id1 flows through the first low voltage winding layer S1, and the second induced current id2 flows through the second low voltage winding layer S2.

As mentioned above, the disclosure provides an integrated transformer, which integrates multiple transformers to the same magnetic core with connecting in series at the high voltage side and connecting in parallel at the low voltage side, and adopts the planar winding design, thereby achieving the effect of current sharing in the application of low voltage output with large current, reducing the current stress and conduction loss of the components at low voltage side, minimizing the total volume, and decreasing the loss. The integrated transformer of this disclosure can be applied to any DC/DC converter such as, for example but not limited to, a forward converter, a half-bridge converter, or a full-bridge converter. The disclosure can be used for achieving two-way voltage conversion function such as converting high voltage to low voltage or converting low voltage to high voltage.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A planar winding transformer, comprising:
a magnetic core set comprising:
a first magnetic core and a second magnetic core, which are parallel to each other, and
only two magnetic columns, which comprise a first magnetic column and a second magnetic column, which are disposed between the first magnetic core and the second magnetic core; and
a plurality of sub-transformers disposed between the first magnetic core and the second magnetic core, wherein a number of the sub-transformers is 2N, N is a natural number and greater than or equal to 2, the sub-transformers are constituted by a plurality of multilayer circuit boards, the multilayer circuit boards are stacked between the first magnetic core and the second magnetic core, the first magnetic column and the second magnetic column penetrate through the multilayer circuit boards, and each of the multilayer circuit boards comprises:
a first low voltage winding layer,
a second low voltage winding layer connected in parallel with the first low voltage winding layer, and
a high voltage winding layer disposed between the first low voltage winding layer and the second low voltage winding layer;
wherein, when the high voltage winding layer receives a polarity current, the first low voltage winding layer and/or the second low voltage winding layer generate a corresponding induced current, and the first magnetic core, the second magnetic core, the first magnetic column and the second magnetic column form a closed path for magnetic flux.

2. The planar winding transformer of claim 1, wherein in each of the multilayer circuit boards, the high voltage winding layer comprises a first high voltage winding and a second high voltage winding connected in series, the first high voltage winding winds around the first magnetic column, and the second high voltage winding winds around the second magnetic column.

3. The planar winding transformer of claim 2, wherein in each of the multilayer circuit boards, a flow direction of the polarity current in the first high voltage winding is opposite to a flow direction of the polarity current in the second high voltage winding.

4. The planar winding transformer of claim 2, wherein in each of the multilayer circuit boards, the first high voltage winding comprises a first high voltage sub-winding and a second high voltage sub-winding electrically connected to each other, and the first high voltage sub-winding is disposed between the second high voltage sub-winding and the first low voltage winding layer; and
wherein the second high voltage winding comprises a third high voltage sub-winding and a fourth high voltage sub-winding electrically connected to each other, the third high voltage sub-winding is disposed between the fourth high voltage sub-winding and the second low voltage winding layer, and the second high voltage sub-winding is electrically connected to the third high voltage sub-winding.

5. The planar winding transformer of claim 4, wherein in each of the multilayer circuit boards, the first high voltage sub-winding and the second high voltage sub-winding are stacked with each other, and are electrically connected to each other through a via.

6. The planar winding transformer of claim 4, wherein in each of the multilayer circuit boards, the third high voltage sub-winding and the fourth high voltage sub-winding are stacked with each other, and are electrically connected to each other through a via.

7. The planar winding transformer of claim 4, wherein in each of the multilayer circuit boards, the first high voltage sub-winding and the fourth high voltage sub-winding are disposed in the same layer of the multilayer circuit board.

8. The planar winding transformer of claim 4, wherein in each of the multilayer circuit boards, the second high voltage sub-winding and the third high voltage sub-winding are disposed in the same layer of the multilayer circuit board, and are electrically connected to each other through a conductive sheet.

9. The planar winding transformer of claim 2, wherein in each of the multilayer circuit boards, the first low voltage winding layer comprises a first low voltage winding and a second low voltage winding, the second low voltage winding layer comprises a third low voltage winding and a fourth low voltage winding, the first low voltage winding and the third low voltage winding wind around the first magnetic column, and the second low voltage winding and the fourth low voltage winding wind around the second magnetic column.

10. The planar winding transformer of claim 9, wherein in each of the multilayer circuit boards, a flow direction of the polarity current flowing around the first magnetic column or the second magnetic column is opposite to a flow direction of the corresponding induced current.

11. The planar winding transformer of claim 1, wherein in each of the multilayer circuit boards, during a positive half cycle, the polarity current is a first polarity current and the generated induced current is a first induced current, and during a negative half cycle, the polarity current is a second polarity current and the generated induced current is a second induced current;

wherein the first induced current flows through a part of the first low voltage winding layer and the second low voltage winding layer, and the second induced current flows through another part of the first low voltage winding layer and the second low voltage winding layer.

12. The planar winding transformer of claim 11, wherein in each of the multilayer circuit boards, the first induced current flows through the first low voltage winding and the third low voltage winding, and the second induced current flows through the second low voltage winding and the fourth low voltage winding.

13. The planar winding transformer of claim 1, wherein each two sub-transformers are constituted by one multilayer circuit board, a number of the multilayer circuit boards is N.

\* \* \* \* \*